(12) United States Patent
Miller et al.

(10) Patent No.: US 7,243,458 B2
(45) Date of Patent: Jul. 17, 2007

(54) COUNTERFLOW INSECT TRAP

(75) Inventors: Mark H. Miller, Hope, RI (US); Bruce E. Wigton, Jamestown, RI (US); Kenneth Lonngren, West Greenwich, RI (US)

(73) Assignee: Woodstream Corporation, Lititz, PA (US)

( * ) Notice: Subject to any disclaimer, the term of this patent is extended or adjusted under 35 U.S.C. 154(b) by 665 days.

(21) Appl. No.: 10/806,223

(22) Filed: Mar. 23, 2004

(65) Prior Publication Data

US 2004/0200135 A1    Oct. 14, 2004

Related U.S. Application Data

(63) Continuation of application No. 09/682,247, filed on Aug. 9, 2001, now abandoned, which is a continuation of application No. 08/718,643, filed on Sep. 17, 1996, now Pat. No. 6,286,249.

(51) Int. Cl.
*A01M 1/08* (2006.01)
*A01M 1/06* (2006.01)

(52) U.S. Cl. .......................................... 43/139; 43/113

(58) Field of Classification Search .................. 43/139, 43/113
See application file for complete search history.

(56) References Cited

U.S. PATENT DOCUMENTS

| | | | |
|---|---|---|---|
| 1,693,368 A | 11/1928 | Cherry | |
| 2,470,564 A | 5/1949 | Lawrence, Jr. et al. | |
| 2,818,110 A | 12/1957 | Rulseh | |
| 2,893,161 A | 7/1959 | Reid | |
| 2,938,577 A | 5/1960 | Hughey | |
| 3,196,577 A | 7/1965 | Plunkett | |
| 3,217,782 A | 11/1965 | Vosper | |
| 3,381,896 A | 5/1968 | Winters | |
| 3,852,042 A | 12/1974 | Wagner | |
| 4,249,673 A | 2/1981 | Katoh et al. | |
| 4,265,611 A | 5/1981 | Reed et al. | |

(Continued)

FOREIGN PATENT DOCUMENTS

FR          717903          1/1932

(Continued)

OTHER PUBLICATIONS

Peterson; Studies of the responses of the female aede; 1951; p. 535-541.

(Continued)

*Primary Examiner*—Kurt Rowan
(74) *Attorney, Agent, or Firm*—Jacobson Holman PLLC

(57) ABSTRACT

A device for attracting and capturing or otherwise disabling insects includes a fan mechanism structured and arranged to provide an outflow of air out of the device to atmosphere, and to draw an inflow directed counter the outflow from atmosphere into the device, the outflow being substantially within the inflow outside of the device. The flow mechanism is also structured and arranged to provide an insect attractant in the outflow. The device can include mounting structure being adapted to position the device with the outflow directed in a substantially downward direction. The outflow attracts insects to the vicinity of the device, and the inflow urges the insects to enter the device. An insect disabling structure is arranged with the flow mechanism to capture or otherwise disable insects being urged into the device by the inflow.

123 Claims, 5 Drawing Sheets

U.S. PATENT DOCUMENTS

| | | | |
|---|---|---|---|
| 4,421,095 | A | 12/1983 | Kreis |
| 4,424,017 | A | 1/1984 | Okigami et al. |
| 4,506,473 | A | 3/1985 | Waters, Jr. |
| 4,519,776 | A | 5/1985 | DeYoreo et al. |
| 4,559,006 | A | 12/1985 | McGill et al. |
| 4,603,505 | A | 8/1986 | Millard |
| 4,608,774 | A | 9/1986 | Sherman |
| 4,634,369 | A | 1/1987 | McGill et al. |
| 4,747,391 | A | 5/1988 | Hanagan et al. |
| 4,785,573 | A | 11/1988 | Millard |
| 4,802,303 | A | 2/1989 | Floyd III |
| 4,829,978 | A | 5/1989 | Schlosser |
| 4,891,904 | A | 1/1990 | Tabita |
| 4,962,611 | A | 10/1990 | Millard |
| 5,157,865 | A | 10/1992 | Chang |
| 5,167,090 | A | 12/1992 | Cody |
| 5,177,961 | A | 1/1993 | Whittenberger |
| 5,189,830 | A | 3/1993 | Montemurro |
| 5,195,883 | A | 3/1993 | Hanna et al. |
| 5,205,064 | A | 4/1993 | Nolen |
| 5,205,065 | A | 4/1993 | Wilson et al. |
| 5,238,681 | A | 8/1993 | Chang et al. |
| 5,255,468 | A | 10/1993 | Cheshire, Jr. |
| 5,274,609 | A | 12/1993 | Bradley |
| 5,282,334 | A | 2/1994 | Kimura et al. |
| 5,301,458 | A | 4/1994 | Deyoreo et al. |
| 5,311,697 | A | 5/1994 | Cavanaugh et al. |
| 5,329,725 | A | 7/1994 | Bible |
| 5,382,422 | A | 1/1995 | Dieguez et al. |
| 5,408,970 | A | 4/1995 | Burkhard et al. |
| 5,417,009 | A | 5/1995 | Butler et al. |
| 5,490,349 | A | 2/1996 | Muramatsu |
| 5,501,033 | A | 3/1996 | Wefler |
| 5,595,018 | A | 1/1997 | Wilbanks |
| 5,644,866 | A | 7/1997 | Katsuda et al. |
| 5,647,164 | A | 7/1997 | Yates |
| 5,651,211 | A | 7/1997 | Regan et al. |
| 5,657,576 | A | 8/1997 | Nicosia |
| 5,669,176 | A | 9/1997 | Miller |
| 6,050,025 | A | 4/2000 | Wilbanks |
| 6,132,203 | A | 10/2000 | Masin |
| 6,145,243 | A | 11/2000 | Wigton et al. |
| 6,286,249 | B1 | 9/2001 | Miller et al. |
| 6,381,408 | B1 | 4/2002 | Jaworski |
| 6,594,946 | B2 | 7/2003 | Nolen et al. |
| 2003/0154643 | A1 | 8/2003 | Spiro et al. |
| 2003/0154645 | A1 | 8/2003 | Spiro et al. |
| 2003/0208951 | A1 | 11/2003 | Bossler |

FOREIGN PATENT DOCUMENTS

| | | |
|---|---|---|
| JP | 1-14128 | 4/1989 |
| JP | 2-63679 | 5/1990 |

OTHER PUBLICATIONS

Sudia et al. Journal of the American Mosquito Control Association, 1988; 4:536-538.

Teledyne Brown Systems; Catalytic burner literature.

Grant et al. "Electrophysiological responses of receptor neurons in mosquito maxillary palp sensilla to carbon dioxide," *J Comp Physiol A* 177 (1995) 389-396.

*Mosquito Ecology Field Sampling Methods*, 2nd ed. (1993) 500, 502, 517, 524, 546-547.

*Mosquito News*, 27:1 (Mar. 1967) 90-92.

Mboera et al. "Comparison of carbon dioxide-baited trapping systems for sampling outdorr mosquito populations in Tanzania," *Medical and Veterinary Entomology* 14 (2000) 257-263.

Peterson et al. "Studies of the Responses of the Female *Aedes* Mosquito. Part III. The Response of the *Aedes Aegypti* (L.) to a Warm Body and its Radiation," *Biting Insect Technology* (1951) 535-541.

Carestia et al. "Effectiveness of Carbon Dioxide as a Mosquito Attractant in the CDC Miniature Light Trap," *J. American Mosquito Control Assn.* 27:1 (Mar. 1967) 90-92.

Service, *Mosquito Ecology Field Sampling Methods*—Chapter 5: "Sampling Adults by Animal Bait Catches and by Animal-Baited Traps," 2nd ed. (1993) 349-498.

Service, *Mosquito Ecology Field Sampling Methods*—Chapter 5: "Sampling Adults by Animal Bait Catches and by Animal-Baited Traps," 2nd ed. (1993) 499-610.

Floor et al. "Mosquito Trapping Studies to Determine Efficacy of Two Models of the Flowtron® Mosquito Luring Device," *J. Florida Anti-Mosquito Assn.* 56:1 (1985) 13-17.

Dipteran Collection Equipment Folder, American Biophysics Corporation.

Owner's Manual, BugVac™ Model 1101 Electronic Insect Killer.

Kline "Comparison of Two American Biophysics Mosquito Traps: The Professional and a New Counterflow Geometry Trap," *J. American Mosquito Control Assn.* 15:3 (1999) 276-282.

Burkett et al. "Light, Carbon Dioxide and Octenol-Baited Mosquito Trap and Host-Seeking Activity Evaluations for Mosquitoes in a Malarious Area of the Republic of Korea," *J. American Mosquito Control Assn.* 17:3 (2001) 196-205.

D.P. Wilton et al. "*Air Flow Direction and Velocity in Light Trap Design*", Ent. Exp. & Appl. 15 (1972) 377-386.

D.L. Klime, "*Olfactory Attractants for Mosquito Surveillance and Control: 1-Octen-3-OL*", Journal of the American Mosquito Control Association, 10(2):280-287, 1994.

Braverman et al., "*Attractiveness of Vertebrate Hosts to Culex pipiens (Diptera: Culicidae) and Other Mosquitoes in Israel*", Journal of Medical Entomology, vol. 28, No. 1, Jan. 1991, p. 133-138.

Jacobson et al., *Chemical Insect Attractants*, Science, Jun. 28, 1963, vol. 140 No. 3574, p. 1367-1374.

Weiting et al., "*The Olfactory Responses of Flies in a New Type of Insect Olfactometer*", Journal of Economic Entomology, vol. 32, No. 1, p. 24-29.

Excerpts from Deposition of Mark Miller, dated Feb. 24, 2004.

Owners Manual for Flowtron Skeeter Eater.

Galaxie Advertisement Article.

Translation of Japanese Patent No. 2-63679.

Translation of Japanese Patent No. 64-14128.

J.L. Shipp article "*Evaluation of a Portable $Co_2$ Generator For Sampling Black Flies*", Dec. 1985.

COUNTERFLOW INSECT TRAP

CROSS REFERENCE TO RELATED APPLICATIONS

This application is a continuation of U.S. Ser. No. 09/682,247, filed Aug. 9, 2001, now abandoned which is further a continuation of U.S. Ser. No. 08/718,643, filed Sep. 17, 1996, now U.S. Pat. No. 6,286,249. These applications, in their entirety, are incorporated herein by reference.

BACKGROUND OF INVENTION

The invention relates to method and device for attracting and trapping or otherwise disabling insects, and, in particular, to a counterflow device that uses an insect attractant in an outflow from the trap.

Suction traps have been used in a variety of configurations to trap or kill insects. It is known to use screened material to trap the insects thus drawn into the trap, and to use mechanical, electrical or poison means to disable, injure or kill the insects. It is also known to use fan mechanisms to generate the suction flow, and to use lights or air-borne attractants to lure the insects to the vicinity of the suction flow. In some configurations, such as disclosed in U.S. Pat. No. 3,196,577 (Plunkett) and U.S. Pat. No. 5,157,090 (Cody), a small flow of an insect attractant is exhausted from the device to the outside of a much larger suction stream.

For devices using air-borne attractants, the trapping efficiency is related to the type of attractant used, the direction of the attractant, the direction of the suction stream, and the direction of the suction stream relative to the attractant.

SUMMARY OF INVENTION

The invention provides a device for attracting and capturing or otherwise disabling insects. The device includes a flow mechanism structured and arranged to provide an outflow of air out of the device to atmosphere, and to draw an inflow directed counter the outflow from atmosphere into the device, the outflow being substantially within the inflow outside of the device. The inflow, therefore, substantially encircles the outflow outside the device. The flow mechanism is also structured and arranged to provide an insect attractant in the outflow. The device can advantageously include mounting structure being adapted to position the device with the outflow directed in a substantially downward direction from an elevation of at least about a foot above ground level. An insect disabling structure is arranged with the flow mechanism to capture or otherwise disable insects being urged into the device by the inflow.

The flow mechanism can include an outflow channel having an opening, a fan mechanism being arranged with the outflow channel to exhaust the outflow to atmosphere, and an inflow channel having at least one opening substantially surrounding the outflow channel opening and through which the inflow is drawn from atmosphere. The outflow channel can include a central space provided within an inner tubular member, the opening of the outflow channel being provided at an open end of the inner tubular member. An outer tubular member having an open end located near the open end of the inner tubular member can be arranged with the inner tubular member to provide a substantially annular-shaped inflow opening therebetween through which the inflow is drawn. The inflow channel can be provided in a substantially annular-shaped region between the inner tubular member and the outer tubular member. A portion of the inner tubular member including the open end can extend beyond the open end of the outer tubular member.

The insect disabling structure can be arranged to communicate with the substantially annular-shaped opening of the inflow channel. The insect disabling structure can include a trap structure arranged to allow ingress and inhibit egress of insects. The insect disabling structure may alternatively or additionally include means for causing injury to insects, such as, for example, an electronic insect killer, a poison delivery system, a mechanical system arranged to cause bodily injury to insects and the like.

A variety of different devices and structures can be used to provide the attractant to the central space for the outflow. For example, a conduit connected to a source of attractant can be arranged to communicate with the central space from outside the inner tubular member. The attractant can include at least one of a pheromone, a kairomone, octenol, carbon dioxide, or any other insect attractant, now known or developed in the future, that can be carried by an air flow. According to one aspect of the invention, at least about 200 ml/min carbon dioxide is provided to the central space. Preferably, at least about 500 ml/min of carbon dioxide is provided to the central space.

According to one aspect of the invention, the inflow channel is connected to the outflow channel, the fan mechanism being arranged to also draw the inflow into the inflow channel. In this arrangement, a second end of the outer tubular member is closed. An annular space provided by the inflow channel communicates with a central space provided by the outflow channel through a distal opening of the inner tubular member distal the open end. A screen material or the like structured to trap insects, which can be a net or mesh bag, is positioned in the central space between the distal opening and the open end. To protect the fan from being fouled by insects drawn into the trap and by insect debris, the fan can be positioned in the central space downstream of the screen material or the like.

According to a different aspect of the invention, a second fan mechanism is arranged with the inflow channel to draw the inflow into the inflow channel. In this arrangement, air can be drawn from atmosphere outside the outer tubular member for mixing with the insect attractant in the outflow. Alternatively, air for mixing with the insect attractant can be drawn from a plenum within the outer tubular member, the outflow fan being positioned to use air from the plenum to generate the outflow. The fan mechanism may also include a screen arranged to inhibit insects in the plenum from entering the central space. In these embodiments, the outer tubular member may include a second end having an opening, the device further having a closed net, screen or the like arranged outside the outer tubular member with a single opening communicating with the opening of the second end of the outer tubular member. The closed net, screen or the like can include, for example, a net bag supported by a frame. The second fan may be positioned upstream and adjacent the single opening of the closed net, screen or the like. Alternatively, instead of a net bag being positioned downstream the second fan, a screen that is structured to inhibit passage of insects can be positioned upstream the second fan. In this arrangement, an annular-shaped cup structure can be positioned to collect dead and dying insects.

The invention also provides a method of urging insects into a device, including emitting a gaseous first flow to atmosphere from an opening of an outflow channel of the device positioned at least about one foot above ground level, directing the first flow towards ground in a substantially downward direction, the first flow including an insect attractant that can be mixed with air. The method further includes drawing a second flow of air into the device, and directing the second flow substantially counter to the first flow and substantially encircling the first flow outside the device, such that insects attracted to the device by the first flow are urged into the device with the second flow. The second flow is advantageously drawn through a channel within the device with a flow velocity that exceeds a maximum flight velocity of a selected variety of insect, such as a variety of mosquito. The method may further include at least one of trapping and causing injury to the insects urged into the device.

The second flow can be drawn into a substantially annular-shaped opening of the device provided between an inner tubular member and an outer tubular member. The first flow can be emitted through an open end of the inner tubular member.

Emitting the gaseous first flow can include emitting at least about 200 ml/min of carbon dioxide, or emitting at least about 500 ml/min of carbon dioxide. The insect attractant may additionally or alternatively include another insect attractant, such as octenol, a kairomone, a pheromone, and the like.

The invention also provides an insect capturing device for use with a suction-type insect trap, including a mesh bag having an opening for coupling to a flow of air being drawn into the trap. The mesh bag is formed of a material structured to allow air to pass freely there through while inhibiting passage of insects. A flat ring made of a stiff material supports the bag around the opening. A layer of adhesive is on one side of the ring. A crushable frusto-conical structure is positioned with its wide end at the opening of the mesh bag and its narrow end within the bag. A removable covering is over the layer of adhesive. A score line across the ring permits the ring to be folded upon itself with the covering removed to close the opening.

DETAILED DESCRIPTION

Figure 1:
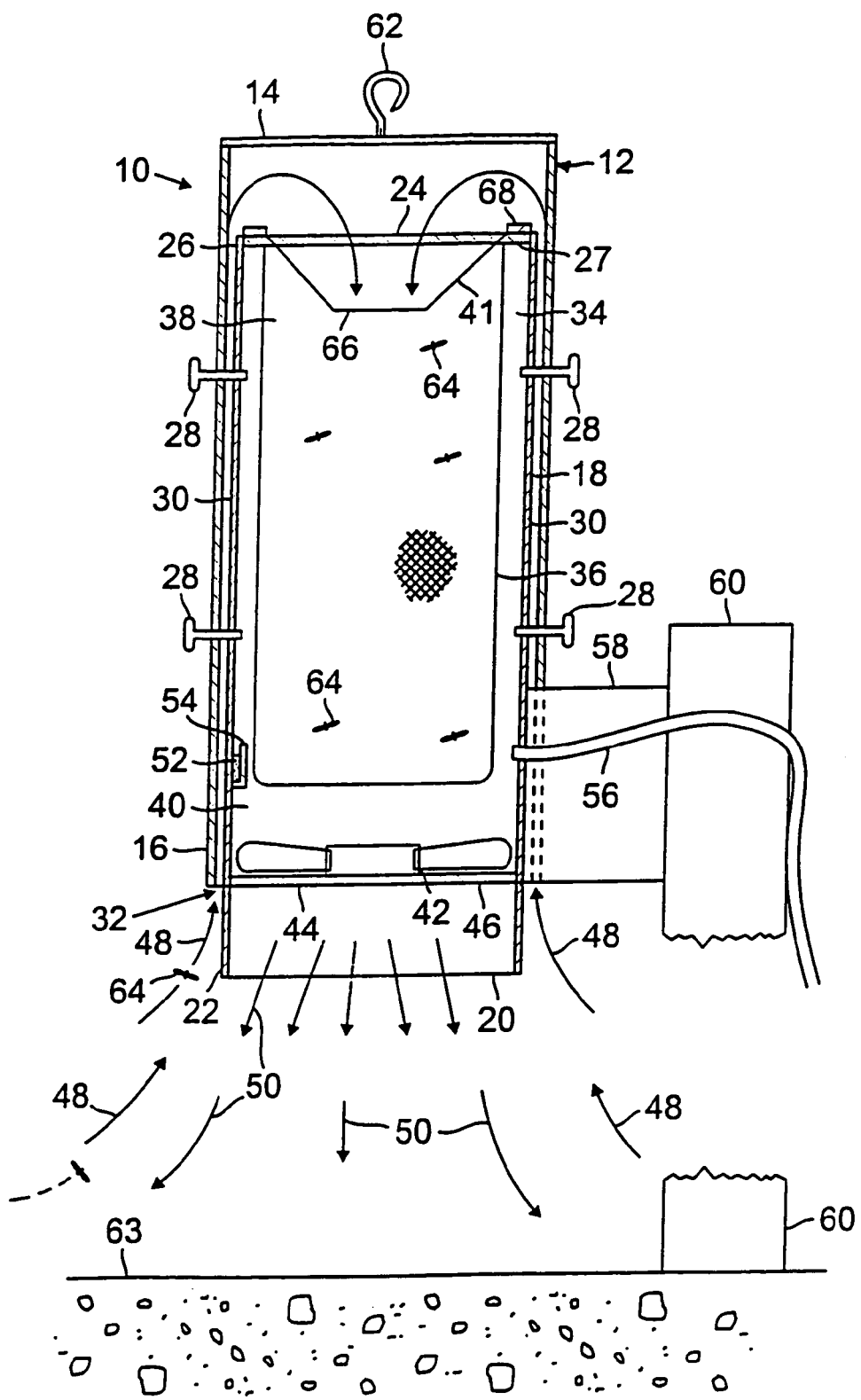
FIG. 1 is a diagrammatic view, in partial longitudinal section, of an insect attracting and trapping device according to the invention.

Referring to the insect trap 10 illustrated in FIG. 1, a vertically positioned cylindrical tubular housing 12 having an enclosed upper end 14 and an open lower end 16 substantially surrounds and covers a cylindrical inner tubular member 18. Tubular member 18 has an outlet opening 20 at its lower end 22, and another opening 24 is provided at an upper end 26 by annular flange 27. Inner tubular member 18 and housing 12 are radially spaced from each other by any suitable mechanical arrangement, such as, for example, by screws 28, so as to create a substantially annular-shaped channel 30 between them. Channel 30 has a substantially annular-shaped inlet 32. Inlet 32 communicates with a central space, or channel 34 provided within tubular member 18 through opening 24 at upper end 26 of tubular member 18. The open lower end 22 of tubular member 18, including outlet opening 20, extends at least to the annular-shaped inlet 32, and preferably a short distance beyond inlet 32.

A mechanism or structure for inhibiting passage of insects but allowing air to pass substantially freely through it is positioned between openings 20 and 24 within central channel 34. A screen material or the like, such as, for example, net or mesh bag 36 hanging from flange 27, can be used to partition central channel 34 into an upper section 38 and a lower section 40. Mesh bag 36 is only open to opening 24 at upper end 26 of tubular member 118. A frusto-conical structure 41 is positioned at opening 24 within mesh bag 36 to encourage insects to enter but not leave bag 38 through opening 24.

A fan 42 is supported within central channel 34 by a plate 44 mounted in the lower end 22 of tubular member 18. In the described embodiment, fan 42 has a nominal 80 mm opening and rotates at about 3000 r.p.m. Plate 44 has openings 46 which allow air exhausted by fan 42 to pass freely. Fan 42 is arranged to create a flow of air (indicated in FIG. 1 by arrows) that is drawn into the device through annular shaped inlet 32, flows up through annular-shaped channel 30, through opening 24 at upper end 26 of tubular member 18, through opening 66 of frusto-conical structure 41, down through central channel 34 and through mesh bag 36, and out through outlet opening 20. Outside device 10, the flow of air 48 being drawn into annular-shaped opening 32 substantially encircles and is directed substantially counter to the flow 20 being exhausted from outlet opening 20. Power can be provided to fan 42 by any suitable and convenient means, such as, for example, batteries, solar panels or line power.

An insect attractant, such as is well known in the art or as may yet be discovered, is mixed with the exhaust flow 50 and discharged though opening 20 of tubular member 18. The attractant can be, for example, an insect pheromone, carbon dioxide, a kairomone, octenol, or any other insect attractant which is known or that may be developed and that can be mixed in an airflow. These attractants can be held within central channel 34 in liquid form 52 by any suitable structure, such as, for example, an open cup 54, or a sponge (not shown) attached to the interior surface of tubular member 18. An insect attractant in solid form (not shown) may be held in central channel 34 by any suitable structure, such as, for example, a clip (not shown). The attractants can also be premixed with air and introduced into central channel 34 by a hose 56 or the like from outside the device 10. Other types of gaseous insect attractants, such as carbon dioxide which is known to attract varieties of mosquitoes, can also be introduced into central channel 34 through hose 56, either premixed with air or undiluted.

Tubular member 18 or housing 12 can be supported in a vertical orientation by a support member 58, which can be, in turn, supported from a post 60 set in the ground, a wall (not shown), or the like. Alternatively, housing can be suspended from a cord or the like by, for example, an eye hook 62 or hanger at the top of housing 12.

To capture mosquito species that fly close to the ground 63, device 10 is positioned such that the opening 20 of inner tubular member 18 is at least one foot and preferably about 2–3 feet elevated above ground level. To capture other species, for example some tropical species that fly in the tree canopy, the device 10 can be positioned at a higher elevation. Generally, however, device 10 works best when exhaust flow 50 discharged though opening 20 of tubular member 18 is directed in a substantially downward direction.

In the embodiment illustrated in FIG. 1, housing 12 is removable from tubular member 18 and support 58 by sliding housing 12 upwards, allowing access to mesh bag 36. A slot in the lower portion of housing 12 slips over support 58. Mesh bag 36 can be structured by any suitable arrangement to hang downward from upper end 26 of tubular member 18 and to be removable for insect disposal. In the described embodiment, mesh bag 36 includes a stiff support ring 68 that rests on flange 27. When replaced, housing 12 may be held in position over tubular member 18 with a variety of suitable arrangements. For example, housing 12 may be held in place by a spring catch (not shown), a detent mechanism (not shown), or one or more fasteners, such as screws 28.

Flying insects 64 are drawn toward to the device 10 by following a plume of air containing the attractant. The plume is created by the downward directed exhaust flow 50 from fan 42. It has been observed that some insects tend to follow the upper edge of a flow of air containing an attractant. Accordingly the device 10 is structured such that the inflow 48 is directed to flow near an upper edge of the outflow 50 outside the device. As the insects 64 follow the upper edge of the exhaust plume, they are led naturally to the suction flow 48 being drawn into device 10, and are thereby urged by suction flow 48 to enter channel 30 through substantially annular-shaped opening 32. Once entrained in a suction stream, the insect's natural tendency is to fly upward to avoid danger, which carries the insect 64 further into the device 10. The insects 64 eventually find their way through opening 24 and opening 66 of frusto-conical structure 41 into mesh bag 36 where they are trapped.

Figure 2:
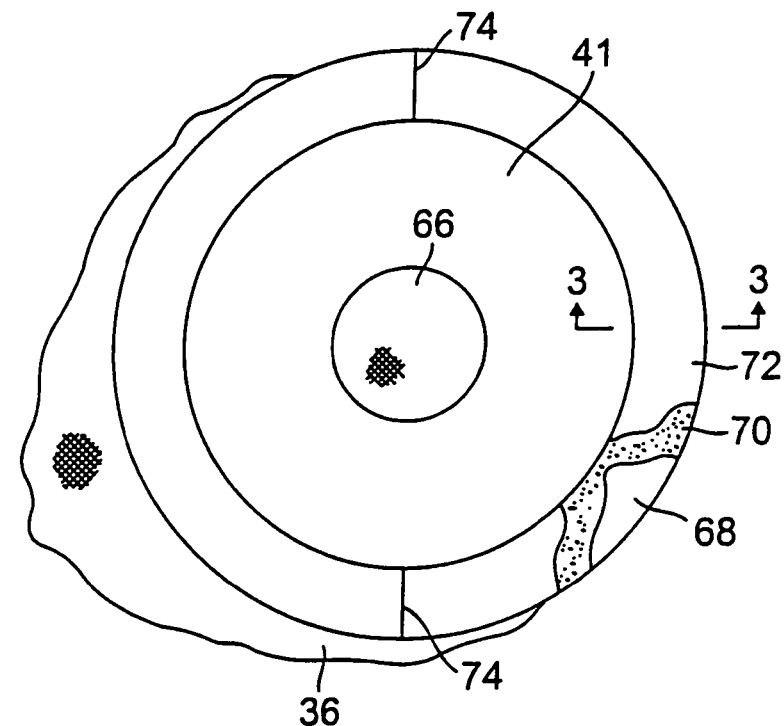
FIG. 2 is a top plan view of a net bag for use with the device illustrated in FIG. 1.

Referring now to FIG. 2, frusto-conical structure 41 can be made of a relatively stiff but crushable, low cost material, such as stiff paper or cardboard. It is inserted in mesh bag 36 when bag 36 is installed. Frusto-conical structure 41 is shaped and sized such that the speed of the air flowing through its smaller opening 66 exceeds the maximum flight speed of a selected variety of insect 64, such as, for example, mosquitoes. This feature allows housing 12 to be removed while fan 42 is operating without allowing insects 64 trapped in bag 36 to escape.

Figure 3:
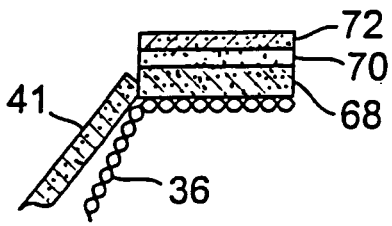
FIG. 3 is a sectional view through line 3—3 of FIG. 2.

Referring now also to FIG. 3, integral with bag 36 at its open end is a ring 68 made of, for example, cardboard, plastic or other low cost material. Frusto-conical structure 41 can be integrally formed with ring 68, glued or otherwise attached to ring 68, or can be a separate article simply inserted into the central opening of ring 68. When installed in device 10, ring 68 rests on top of annular flange 27, with mesh bag 36 extending through opening 24 into channel 34. Ring-68 has a layer of adhesive 70 on its upper surface, covered in turn with a removable wax paper ring 72. Ring 68 is structured to permit preferential folding across a diameter, for example by including a line of weakness, such as score line 74. Before mesh bag 36 is removed from tubular member 18, the wax paper ring 72 is removed to expose the adhesive layer 70. Ring 68 is then folded along score line 74 such that the adhesive layer seals bag 68 with trapped insects 64 and frusto-conical structure 41 inside.

Figure 4:
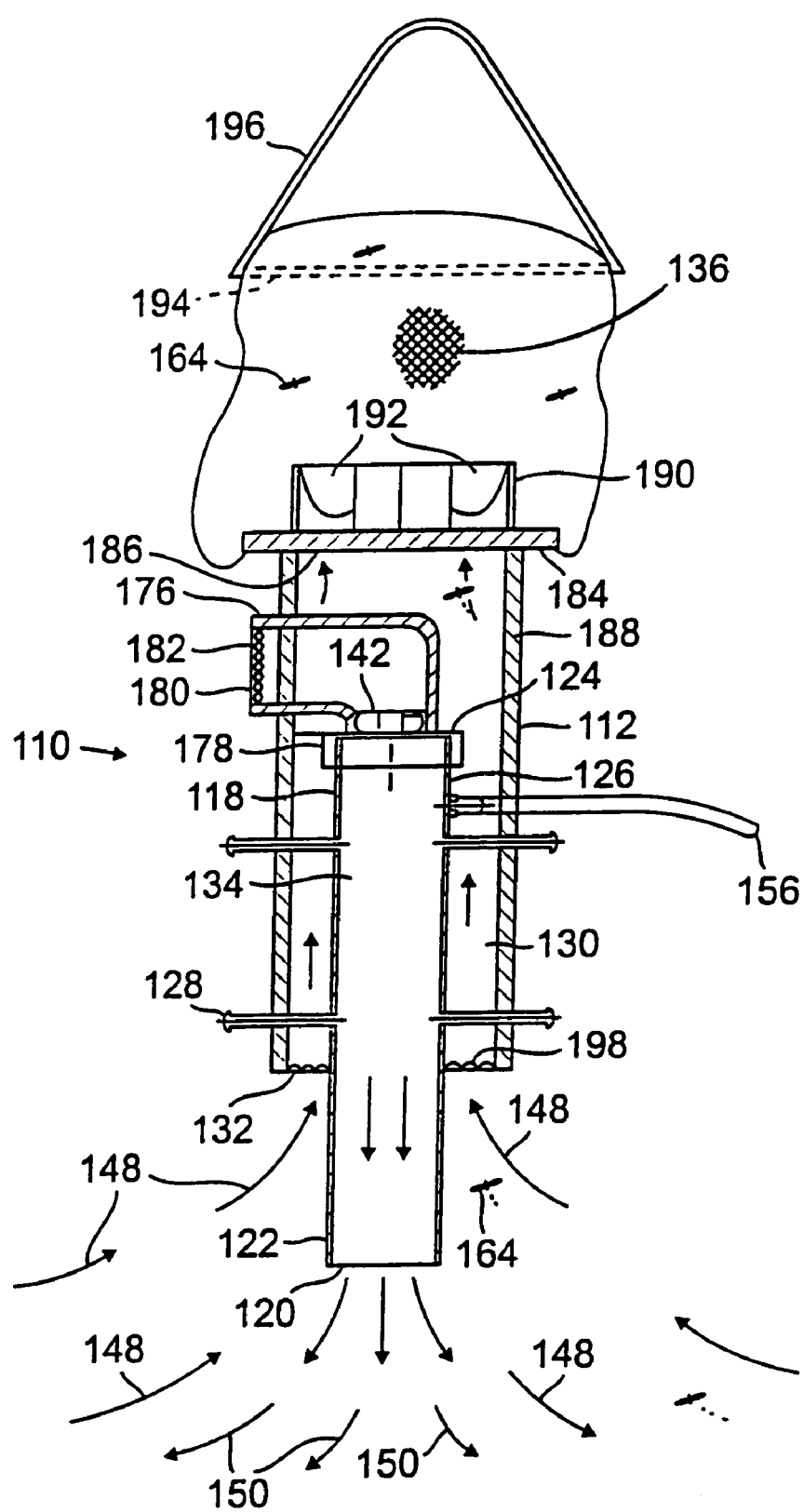
FIG. 4 is a diagrammatic view in partial longitudinal section of a second embodiment to the invention.

Referring now to FIG. 4, another embodiment of an insect trapping device 110 includes an inner tube 118 having openings 120, 124 at respective lower and upper ends 122, 126. An outer tube 112 forming a housing is arranged over and substantially concentric with the inner tube 118 to provide an approximately annular-shaped channel 130 with a substantially annular-shaped inlet opening 132 between them. Opening 132 faces the same direction as opening 120 near the lower end of inner tube 118. A tubular elbow 176 is connected to upper end 126 of inner tube 118 by a flange 178 or the like and extends out from the side of outer tube 112 to atmosphere.

A small fan mechanism 142 is positioned within a channel 134 provided by inner tube 118 and elbow 176 for drawing air in through inlet 180 of elbow 176 and blowing the air out through opening 120 at lower end 122 of inner tube 118. Fan mechanism 142 may include a fan with a nominal 40 mm opening that rotates at about 3000 r.p.m. A conduit, such as hose 156, is connected to inner tube 118 to introduce an insect attractant into the flow of air being blown out of opening 120. A screen 182 is positioned in elbow inlet 180 to prevent insects from being drawn into channel 134 through elbow 176 and fouling fan mechanism 142.

A plate 184 or {range or the like having an outlet opening 186 is mounted over the upper end 188 of outer tube 112. Another, larger fan mechanism 190 mounted on plate 184 is positioned adjacent outlet opening 186. In the illustrated embodiment, fan mechanism 190 includes a fan with a nominal 80 mm opening that rotates at about 3000 r.p.m. Fan mechanism 190 is arranged to draw a flow of air from atmosphere outside the device into the substantially annular-shaped opening 132, through channel 130, and out through the outlet opening 186 at upper end 188 of outer tube 112.

A net or mesh bag 136 is positioned over plate 184 to catch insects 164 that are drawn into channel 130 by fan mechanism 190. Mesh bag may be removably attached to flange184 with a drawstring closure (not shown), an elastic band (not shown), a hook and loop fastener (not shown) or the like. In the illustrated embodiment, mesh bag 136 includes a support hoop 194 and a hanger 196 for mounting device 110.

Fan mechanism 142 exhausts a mixture of attractant and air from inner tube 118 in a flow 150 directed downwards from opening 120. Fan mechanism 190 draws atmospheric air through annular-shaped opening 132 into channel 130, generating a second flow 148 that substantially encircles exhaust flow 150 and is directed substantially counter to exhaust flow 150. Insects 164 attracted to the vicinity of trap 110 by the attractant flow 150 are encouraged to enter channel 130 by the surrounding counterflow 148 being drawn into opening 132. The second flow 148 generated by fan mechanism 190 within channel 130 draws insects 164 up and through opening 186 into mesh bag 136, where they are retained. The updraft of air from fan mechanism 190 and the spinning blades 192 of fan mechanism 190 help to keep captured insects 164 from leaving mesh bag 136 through opening 186. Channel 130 and fan mechanism 190 may be cooperatively structured and arranged such that the second flow 148 within channel has an upward directed velocity that is greater than a mosquito's maximum flight velocity.

Trap 110 is also structured to disable insects. Some insects 164 traveling through opening 186 may be injured or killed by the rotating blades 192 of fan mechanism 190. A large mesh screen 198 can be used to keep large sized varieties of insects from entering channel 130 and fouling the blades 192. Mesh bag 136 may be sprayed or otherwise treated with an insect poison (not shown), as is known in the art. A poison bait (not shown) may also be placed inside bag 136 or in channel 130.

Figure 5:
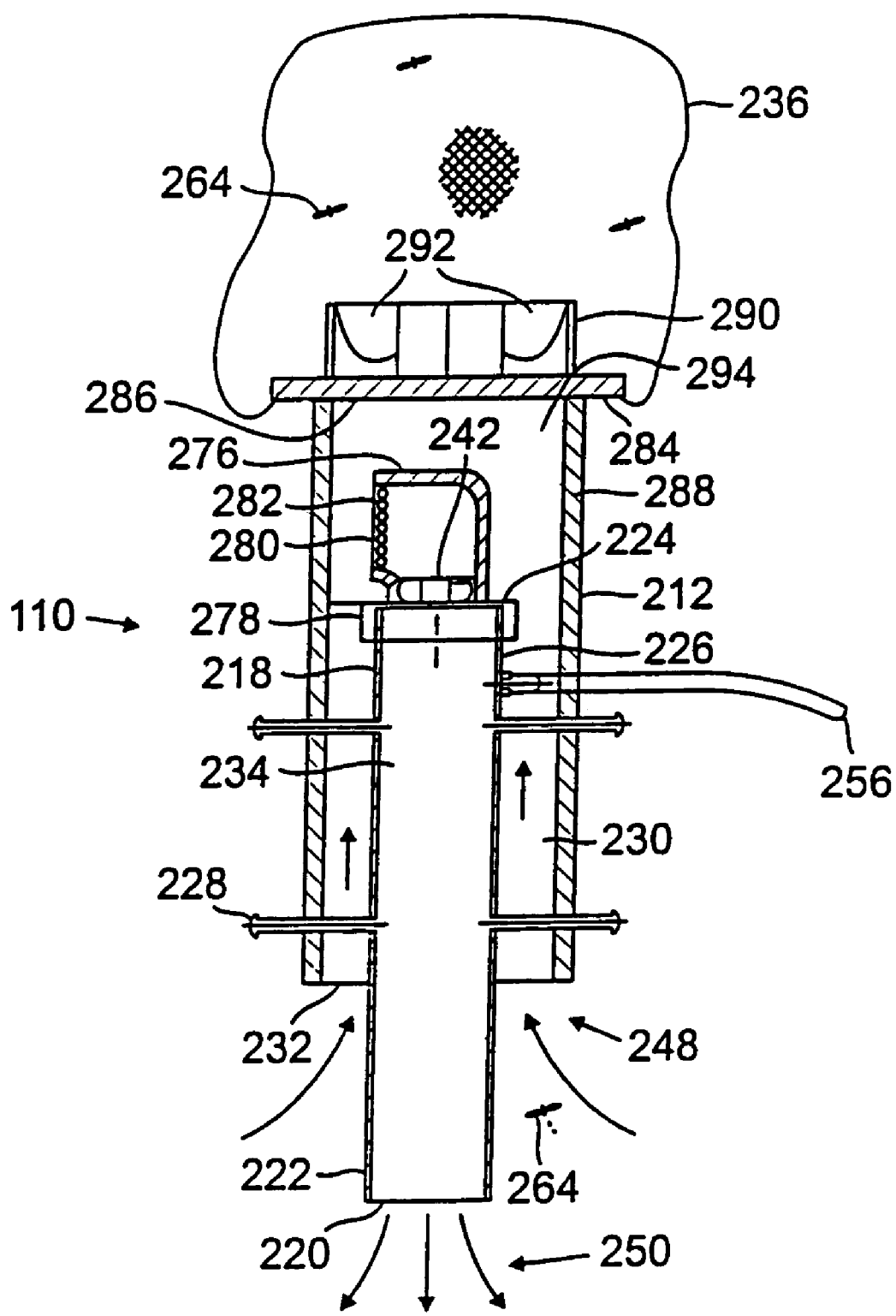
FIG. 5 is a diagrammatic view in partial longitudinal section of a third embodiment of the invention.

Referring now to FIG. 5, another embodiment of an insect trap 210 is structured similarly in most respects to trap 110 described above with reference to FIG. 4. Device 210 includes an inner tube 218 having openings 220, 224 at respective lower and upper ends 222, 226, and a substantially concentric outer tube 212 arranged with inner tube 218 to provide an annular-shaped channel 230 with at an annular shaped opening 232. A fan mechanism 290 mounted to a plate 284 on an upper end 288 of outer tube 212 draws atmospheric air in through opening 232, through channel 230, through opening 286 in plate 284 and into mesh bag 236. Another fan mechanism 242 is mounted on a flange 278 or the like at the upper end 226 of inner tube 218. A hose 256 coupled to a source of insect attractant introduces the attractant to a central channel 234 within inner tube 218. Device 210 differs from device 110 in that the air drawn into central channel 234 by fan mechanism 242 is diverted from a plenum 294 in upper end 288 of outer tube 212, rather than from atmosphere. A screen 282 in an inlet 280 of a fan mechanism housing 276 inhibits insects in channel 230 from entering channel 234.

The embodiments described above include a single central channel through which the outflow with insect attractant is exhausted and a single, substantially annular-shaped outer opening and channel through which an inflow is drawn. The counterflow between the outflow and inflow outside the device, wherein the outflow encircles the inflow, can be produced with other structures. The inflow opening and channel can be more crescent-shaped if the inner and outer tubes are not aligned on the same axis. The tubular members also do not have to be cylindrical. Instead of a single inflow opening or a single outflow opening, several inflow openings or outflow openings may be used.

Figure 6:
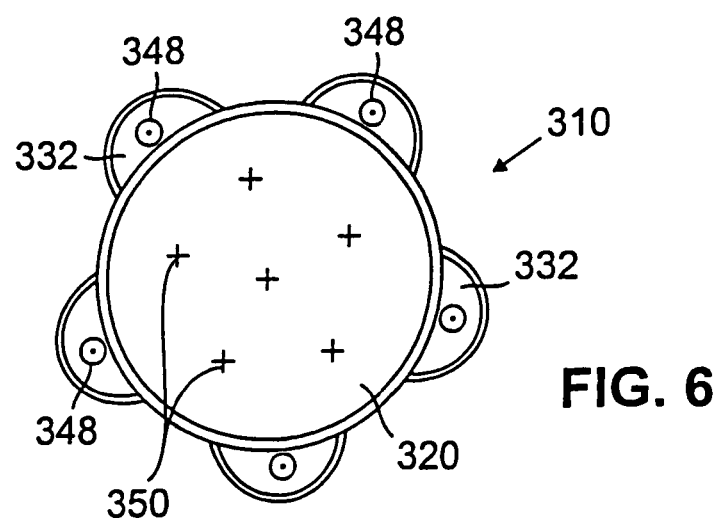
FIG. 6 is a diagrammatic plan view of a bottom end of a fourth embodiment of the invention.

Referring now to FIG. 6, a counterflow insect trap 310 is shown with a central opening 320 through which the outflow 350 (indicated in FIG. 6 with crosses) is exhausted. The inflow 348 (indicated with bull's-eyes) is drawn through a plurality of inflow openings 332 arrayed around the central opening 320. The insects attracted to the device 310 are urged by the inflow 348 to enter the device through any of inflow openings 332. The inflow openings 332 connect to an outer channel (not shown) which leads to an insect disabling device, such as a trap (not shown) or the like. The remainder of device 310 can be constructed similar to other embodiments as described above.

Figure 7:
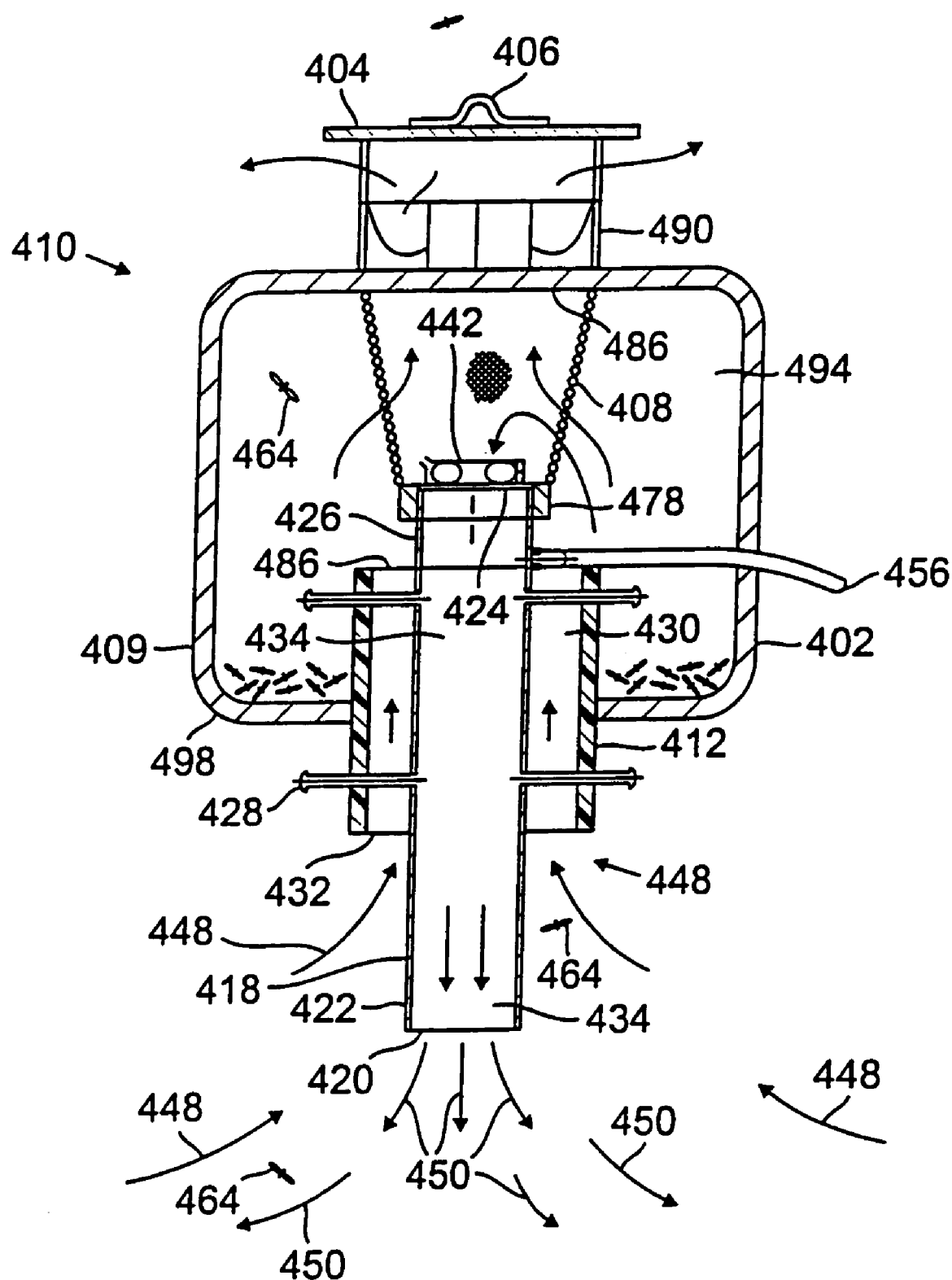
FIG. 7 is a diagrammatic view in partial longitudinal section of a fourth embodiment of the invention.

Referring now to FIG. 7, yet another embodiment of an insect trap 410 includes an inner tube 418 having openings 420, 424 at respective lower and upper ends 422, 426, and a substantially concentric outer tube 412 arranged with inner tube 418 to provide an annular-shaped channel 430 with an annular shaped opening 432. Inner tube 418 and outer tube 412 are held apart by screws 428. Outer tube 412 has another opening 486 at its upper end that opens to a plenum 494 inside of an upper housing 402. Housing 402 is generally pickle-jar shaped. A lower end of upper housing 402 closes around outer tube 412. An upper end of upper housing 402 has an opening 486 above inner tube 418. A small fan mechanism 442 with a 40 mm nominal opening is mounted on a flange 478 or the like at the upper end 426 of inner tube 418. A large fan mechanism 490 with an 80 mm nominal opening is mounted over opening 486 of housing 402. Each fan mechanism 442, 490 operates at about 3000 r.p.m. A cap 404 keeps rain and debris out of fan mechanism 490. An eyelet 406 at the top of cap 404 allows device 410 to be hung from a hook or cord (not shown) above ground level. A mesh screen 408 is positioned between opening 486 and flange 478 to keep insects 464 in plenum 494 from being driven by fan mechanisms 442 or 490 through openings 424 or 486, respectively. A conduit or hose 456 that is coupled to a source of insect attractant introduces the attractant to a central channel 434 within inner tube 418.

Small fan mechanism 442 generates a first flow of air mixed with insect attractant through channel 434 provided inside inner tube 418 and out to atmosphere through opening 420. Large fan mechanism generates a second flow of air that is drawn from atmosphere into device 410 through opening 432, up through channel 430, and into plenum 494. Most of the air in plenum 494 is exhausted by fan mechanism 490 out through opening 486 to atmosphere. Small fan mechanism 442 also draws air from plenum 494 into channel 434 to generate the first flow 450. Thus, each of the fan mechanisms help to draw the second flow 448 through opening 432.

The second flow 448 substantially encircles the first flow 450 outside the device 410. Insects 464, in particular some types of mosquitoes, that are attracted to the device 410 by the attractant travel towards the device along the upper edge of the first flow 450. When the insects approach the device 410, they are urged by the second flow 448 into channel 430 through opening 432, then into plenum 494. Some insects, such as mosquitoes, use visual cues to avoid flying into objects. Therefore, in the described embodiment, outer tube 412 and inner tube 418 are fabricated of clear materials, such as, for example, a clear plastic, a clear acrylic or the like, so that the insects will not try to avoid approaching close to opening 432.

Once inside plenum 494, mesh screen 408 blocks the insects 464 from exiting through opening 424 or opening 486. Second flow 448 is of sufficient velocity as it enters plenum 494 from channel 430 to inhibit insects from going back into channel 430. Preferably, the flow velocity of the second flow in channel 430 is greater than the maximum flight velocity of a mosquito, or greater than about 6–7 m.p.h. The insects 464 in plenum 494, being unable to escape, become exhausted and desiccated, and drop to the bottom of housing 402. Housing 402 and outer tube 412 are together structured to form an annular-shaped cup 409 to catch the fallen insects 498.

The insect disabling mechanisms described above with reference to the embodiment illustrated in FIG. 4 can be used with other embodiments as well. In addition, other disabling mechanisms now known or to be discovered, such as, for example, an electric grid, can be incorporated into an insect trapping and disabling device according to the invention. A light may be incorporated into a device made according to the invention to assist in attracting insects. Moreover, devices made according to the invention may include an insect trapping device and not an insect disabling device, an insect disabling device and not an insect trapping device, or both a trapping and a disabling device.

The traps disclosed above with reference to the drawing may be used to capture and disable a wide variety of insect species using one or more insect attractants. A field trial was conducted in late August near Gainesville, Fla. using a counterflow insect trap structured similarly to device 210, which is described above with reference to FIG. 5. In this trial, a CO2 flow of 500 ml/min was introduced into the central channel of the inner tube. An octenol attractant was also positioned outside of the outer tube. In a twelve hour period, the counterflow device trapped 1725 insects, the vast majority of which were varieties of mosquito, including 507 Ae. atlanticus, 212 Ae. infirmatus, 689 An. crucians, 115 Cq. perturbans, and 102 Cx. malanoconion. It is expected that further improvements can be made by adjusting flow rates and amounts and types of attractant.

Other embodiments are within the scope of the following claims.

What is claimed is:

1. A device for capturing flying insects, said device comprising:
   an insect trap;
   an airflow generator generating (a) an outflow comprising an insect attractant dispersed therein and (b) an inflow;
   an outflow opening communicated to said airflow generator, said outflow opening enabling said outflow to flow outwardly from said device and spread downwardly and radially from said device; and
   an inlet opening communicated to said airflow generator and said insect trap and positioned vertically higher than said outlet opening, said airflow generator drawing said inflow into said trap via said inlet opening such that insects intersecting said inflow are drawn into said trap;
   said airflow generator generating said inflow and said outflow in a counterflow relationship wherein, outside the device, an overlapping region of said inflow overlaps an overlapped region of said outflow and flows substantially counter to and immediately adjacent the overlapped region of said outflow.

2. A device according to claim 1, wherein said outflow opening faces downwardly and directs said outflow downwardly.

3. A device according to claim 2, further comprising a tubular member having an open lower end providing said outflow opening.

4. A device according to claim 3, further comprising a cover member positioned with respect to said tubular member such that an edge portion of said cover member is spaced from said tubular member to define said inlet opening,
   said tubular member having an open upper end in communication with said inlet opening to enable said inflow to flow through said tubular member and out said open lower end as part of said outflow.

5. A device according to claim 4, wherein said cover member is a tubular housing comprising a top wall and a tubular wall extending downwardly from said top wall,
   said tubular housing being positioned over said tubular member such that said tubular wall extends downwardly alongside said tubular member to define said inlet as an annular downwardly facing opening between said edge portion and said tubular member.

6. A device according to claim 4, wherein said airflow generator comprises a fan.

7. A device according to claim 6, wherein said fan is a single fan.

8. A device according to claim 7, wherein said fan is positioned within said tubular member.

9. A device according to claim 8, wherein said insect trap is positioned within said tubular member.

10. A device according to claim 9, wherein said insect trap is a flexible mesh structure.

11. A device according to claim 10, wherein said mesh structure is positioned above said fan.

12. A device according to claim 11, wherein said insect attractant is carbon dioxide.

13. A device according to claim 12, wherein said carbon dioxide is supplied to said tubular member at a point higher than said fan.

14. A device according to claim 13, further comprising a tank containing said carbon dioxide and a hose supplying said carbon dioxide to said tubular member from said tank.

15. A device according to claim 14, wherein said hose supplies said carbon dioxide directly to said tubular member.

16. A device according to claim 15, wherein said tubular member has a port formed therethrough and said hose is connected to said port.

17. A device according to claim 1, wherein said airflow generator comprises a fan.

18. A device according to claim 17, wherein said airflow generator is a single fan.

19. A device according to claim 17, wherein said airflow generator comprises multiple fans.

20. A device according to claim 19, wherein said multiple fans is two fans, one of said fans generating said inflow, the other of said fans generating said outflow.

21. A device according to claim 1, wherein said insect trap is a flexible mesh structure.

22. A device according to claim 1, wherein said insect attractant is carbon dioxide.

23. A device according to claim 22, further comprising a tank containing said carbon dioxide.

24. A method for capturing flying insects using a device for capturing flying insects, said device comprising an insect trap; said method comprising:
   generating an outflow, comprising an insect attractant dispersed therein, flowing outwardly from said device and spreading downwardly and radially from said device; and
   generating an inflow flowing into said trap such that insects intersecting said inflow are drawn into said trap;
   wherein said inflow and said outflow are generated in a counterflow relationship wherein, outside the device, an overlapping region of said inflow overlaps an overlapped region of said outflow and flows substantially counter to and immediately adjacent the overlapped region of said outflow.

25. A method according to claim 24, wherein said device includes an airflow generator, an outflow opening communicated with said airflow generator, and an inflow opening communicated with said insect trap and said airflow generator,
   said generating said inflow and said generating said outflow being performed by said airflow generator.

26. A method according to claim 25, wherein said outflow opening faces downwardly and wherein said outflow opening directs said outflow downwardly.

27. A method according to claim 26, wherein said device further comprises a tubular member having an open lower end providing said outflow opening; said generating said outflow including directing said outflow through said open lower end.

28. A method according to claim 27, wherein said device further comprises a cover member positioned with respect to said tubular member such that an edge portion of said cover member is spaced from said tubular member to define said inlet opening, said tubular member having an open upper end in communication with said inlet opening;
   said generating said outflow and said generating said inflow being performed by drawing said inflow in through said inlet opening into said open upper end and then out through said open lower end so that said inflow is part of said outflow.

29. A method according to claim 28, wherein said cover member is a tubular housing comprising a top wall and a tubular wall extending downwardly from said top wall, said tubular housing being positioned over said tubular member such that said tubular wall extends downwardly alongside said tubular member to define said inlet opening as an annular downwardly facing opening between said edge portion and said tubular member, said generating said inflow including drawing said inflow upwardly from said inlet opening between said tubular wall and said tubular member and then into said open upper end of said tubular member.

30. A method according to claim 28, wherein said airflow generator comprises a single fan and wherein both generating said inflow and generating said outflow is performed by operating said fan.

31. A method according to claim 30, wherein said insect attractant is carbon dioxide and said method further comprises supplying said carbon dioxide to said tubular member.

32. A method according to claim 31, wherein said fan is positioned within said tubular member and wherein said carbon dioxide is supplied at a point higher than said fan.

33. A method according to claim 32, wherein said carbon dioxide is supplied directly to said tubular member.

34. A method according to claim 31, wherein said carbon dioxide is supplied directly to said tubular member.

35. A device according to claim 3, wherein said insect attractant is carbon dioxide.

36. A device according to claim 35, further comprising a tank containing said carbon dioxide.

37. A device according to claim 36, further comprising a hose supplying said carbon dioxide from said tank to said tubular member.

38. A device according to claim 37 wherein said hose supplies said carbon dioxide directly to said tubular member.

39. A method for capturing flying insects using a device for capturing flying insects, said device comprising an insect trap; said method comprising:

generating an outflow, comprising an insect attractant dispersed therein, flowing outwardly from said device and spreading downwardly and radially from said device; and generating an inflow flowing into said trap such that insects intersecting said inflow are drawn into said trap;

wherein said inflow and said outflow are generated in a counterflow relationship wherein, outside the device, an overlapping region of said inflow overlaps an overlapped region of said outflow and flows substantially counter to the overlapped region of said outflow.

40. A method according to claim 39, wherein said device includes an airflow generator, an outflow opening communicated with said airflow generator, and an inflow opening communicated with said insect trap and said airflow generator, said generating said inflow and said generating said outflow being performed by said airflow generator.

41. A method according to claim 40, wherein said outflow opening faces downwardly and wherein said outflow opening directs said outflow downwardly to create said plume.

42. A method according to claim 41, wherein said device further comprises a tubular member having an open lower end providing said outflow opening; said generating said outflow including directing said outflow through said open lower end.

43. A method according to claim 42, wherein said device further comprises a cover member positioned with respect to said tubular member such that an edge portion of said cover member is spaced from said tubular member to define said inlet opening, said tubular member having an open upper end in communication with said inlet opening;

said generating said outflow and said generating said inflow being performed by drawing said inflow in through said inlet opening into said open upper end and then out through said open lower end so that said inflow is part of said outflow.

44. A method according to claim 43, wherein said cover member is a tubular housing comprising a top wall and a tubular wall extending downwardly from said top wall, said tubular housing being positioned over said tubular member such that said tubular wall extends downwardly alongside said tubular member to define said inlet opening as an annular downwardly facing opening between said edge portion and said tubular member, said generating said inflow including drawing said inflow upwardly from said inlet opening between said tubular wall and said tubular member and then into said open upper end of said tubular member.

45. A method according to claim 43, wherein said airflow generator comprises a single fan and wherein both generating said inflow and generating said outflow is performed by operating said fan.

46. A method according to claim 45, wherein said insect attractant is carbon dioxide and said method further comprises supplying said carbon dioxide to said tubular member.

47. A method according to claim 46, wherein said fan is positioned within said tubular member and wherein said carbon dioxide is supplied at a point higher than said fan.

48. A method according to claim 47, wherein said carbon dioxide is supplied directly to said tubular member.

49. A method according to claim 48, wherein said carbon dioxide is supplied directly to said tubular member.

50. A device for capturing flying insects, said device comprising:

an insect trap;

an airflow generator generating (a) an outflow comprising an insect attractant dispersed therein and (b) an inflow;

an outflow opening communicated to said airflow generator, said outflow opening enabling said outflow to flow outwardly from said device and spread downwardly and radially from said device; and an inlet opening communicated to said airflow generator and said insect trap and positioned vertically higher than said outlet opening, said airflow generator drawing said inflow into said trap via said inlet opening such that insects intersecting said inflow are drawn into said trap;

said airflow generator generating said inflow and said outflow in a counterflow relationship wherein, outside the device, an overlapping region of said inflow overlaps an overlapped region of said outflow and flows substantially counter to the overlapped region of said outflow.

51. A device according to claim 50, wherein said outflow opening faces downwardly and directs said outflow downwardly.

52. A device according to claim 51, further comprising a tubular member having an open lower end providing said outflow opening.

53. A device according to claim 52, further comprising a cover member positioned with respect to said tubular member such that an edge portion of said cover member is spaced from said tubular member to define said inlet opening, said tubular member having an open upper end in communication with said inlet opening to enable said inflow to flow through said tubular member and out said open lower end as part of said outflow.

54. A device according to claim 53, wherein said cover member is a tubular housing comprising a top wall and a tubular wall extending downwardly from said top wall, said tubular housing being positioned over said tubular member such that said tubular wall extends downwardly alongside said tubular member to define said inlet as an annular downwardly facing opening between said edge portion and said tubular member.

55. A device according to claim 53, wherein said airflow generator comprises a fan.

56. A device according to claim 55, wherein said fan is a single fan.

57. A device according to claim 56, wherein said fan is positioned within said tubular member.

58. A device according to claim 57, wherein said insect trap is positioned within said tubular member.

59. A device according to claim 58, wherein said insect trap is a flexible mesh structure.

60. A device according to claim 59, wherein said mesh structure is positioned above said fan.

61. A device according to claim 59, wherein said insect attractant is carbon dioxide.

62. A device according to claim 61, wherein said carbon dioxide is supplied to said tubular member at a point higher than said fan.

63. A device according to claim 62, further comprising a tank containing said carbon dioxide and a hose supplying said carbon dioxide to said tubular member from said tank.

64. A device according to claim 63, wherein said hose supplies said carbon dioxide directly to said tubular member.

65. A device according to claim 64, wherein said tubular member has a port formed therethrough and said hose is connected to said port.

66. A device according to claim 50, wherein said airflow generator comprises a fan.

67. A device according to claim 66, wherein said airflow generator is a single fan.

68. A device according to claim 66, wherein said airflow generator comprises multiple fans.

69. A device according to claim 68, wherein said multiple fans is two fans, one of said fans generating said inflow, the other of said fans generating said outflow.

70. A device according to claim 50, wherein said insect trap is a flexible mesh structure.

71. A device according to claim 50, wherein said insect attractant is carbon dioxide.

72. A device according to claim 71, further comprising a tank containing said carbon dioxide.

73. A device according to claim 52, wherein said insect attractant is carbon dioxide.

74. A device according to claim 73, further comprising a tank containing said carbon dioxide.

75. A device according to claim 74, further comprising a hose supplying said carbon dioxide from said tank to said tubular member.

76. A device according to claim 75, wherein said hose supplies said carbon dioxide directly to said tubular member.

77. A device according to claim 1, wherein said outflow comprises an effective amount of the insect attractant dispersed therein.

78. A method according to claim 24, wherein said outflow comprises an effective amount of the insect attractant dispersed therein.

79. A method according to claim 39, wherein said outflow comprises an effective amount of the insect attractant dispersed therein.

80. A device according to claim 50, wherein said outflow comprises an effective amount of the insect attractant dispersed therein.

81. A method according to claim 24, wherein said insect attractant is carbon dioxide.

82. A method according to claim 39, wherein said insect attractant is carbon dioxide.

83. A device for capturing flying insects, comprising:
an insect trap;
an airflow generator generating (a) an outflow comprising an insect attractant dispersed therein and (b) an inflow;
an outflow opening communicated to said airflow generator, said outflow opening enabling said outflow to flow outwardly from said device; and
an inflow opening communicated to said airflow generator and said insect trap, said airflow generator drawing said inflow into said trap such that insects intersecting said inflow are drawn into said trap;
said airflow generator generating said inflow and said outflow such that, outside said device, said inflow extends substantially to or below an elevation of the outflow opening.

84. A device according to claim 83, wherein said airflow generator generates said inflow and said outflow in a counterflow relationship wherein, outside the device, an over lapping region of said inflow overlaps an overlapped region of said outflow and flows substantially counter to and immediately adjacent the overlapped region of said outflow.

85. A device according to claim 83, wherein said outflow opening faces downwardly and directs said outflow downwardly.

86. A device according to claim 85, further comprising a tubular member having an open lower end providing said outflow opening.

87. A device according to claim 86, further comprising a cover member positioned with respect to said tubular member such that an edge portion of said cover member is spaced from said tubular member to define said inlet opening,
said tubular member having an open upper end in communication with said inlet opening to enable said inflow to flow through said tubular member and out said open lower end as part of said outflow.

88. A device according to claim 87, wherein said cover member is a tubular housing comprising a top wall and a tubular wall extending downwardly from said top wall,
said tubular housing being positioned over said tubular member such that said tubular wall extends downwardly alongside said tubular member to define said inlet as an annular downwardly facing opening between said edge portion and said tubular member.

89. A device according to claim 86, wherein said airflow generator comprises a fan.

90. A device according to claim 89, wherein said fan is a single fan.

91. A device according to claim 90, wherein said fan is positioned within said tubular member.

92. A device according to claim 91, wherein said insect trap is positioned within said tubular member.

93. A device according to claim 92, wherein said insect trap is a flexible mesh structure.

94. A device according to claim 93, wherein said mesh structure is positioned above said fan.

95. A device according to claim 94, wherein said insect attractant is carbon dioxide.

96. A device according to claim 95, wherein said carbon dioxide is supplied to said tubular member at a point higher than said fan.

97. A device according to claim 96, further comprising a tank containing said carbon dioxide and a hose supplying said carbon dioxide to said tubular member from said tank.

98. A device according to claim 97, wherein said hose supplies said carbon dioxide directly to said tubular member.

99. A device according to claim 98, wherein said tubular member has a port formed therethrough and said hose is connected to said port.

100. A device according to claim 83, wherein said airflow generator comprises a fan.

101. A device according to claim 100, wherein said airflow generator is a single fan.

102. A device according to claim 100, wherein said airflow generator comprises multiple fans.

103. A device according to claim 102, wherein said multiple fans is two fans, one of said fans generating said inflow, the other of said fans generating said outflow.

104. A device according to claim 83, wherein said insect trap is a flexible mesh structure.

105. A device according to claim 83, wherein said insect attractant is carbon dioxide.

106. A device according to claim 105, further comprising a tank containing said carbon dioxide.

107. A device according to claim 86, wherein said insect attractant is carbon dioxide.

108. A device according to claim 107, further comprising a tank containing said carbon dioxide.

109. A device according to claim 108, further comprising a hose supplying said carbon dioxide from said tank to said tubular member.

110. A device according to claim 109 wherein said hose supplies said carbon dioxide directly to said tubular member.

111. A device according to claim 83, wherein said outflow comprises an effective amount of the insect attractant dispersed therein.

112. A method for capturing flying insects using a device for capturing flying insects, said device comprising an insect trap; said method comprising:

generating an outflow, comprising an insect attractant dispersed therein, flowing outwardly from an outflow opening on said device;

generating an inflow flowing into said trap such that insects intersecting said inflow are drawn into said trap;

wherein said inflow and said outflow are generated such that, outside said device, said inflow extends substantially to or below an elevation of the outflow opening.

113. A method according to claim 112, wherein said inflow and said outflow are generated in a counterflow relationship wherein, outside the device, an overlapping region of said inflow overlaps an overlapped region of said outflow and flows substantially counter to and immediately adjacent the overlapped region of said outflow.

114. A method according to claim 112, wherein said device includes an airflow generator, an outflow opening communicated with said airflow generator, and an inflow opening communicated with said insect trap and said airflow generator, said generating said inflow and said generating said outflow being performed by said airflow generator.

115. A method according to claim 114, wherein said outflow opening faces downwardly and wherein said outflow opening directs said outflow downwardly to create said plume.

116. A method according to claim 115, wherein said device further comprises a tubular member having an open lower end providing said outflow opening; said generating said outflow including directing said outflow through said open lower end.

117. A method according to claim 116, wherein said device further comprises a cover member positioned with respect to said tubular member such that an edge portion of said cover member is spaced from said tubular member to define said inlet opening, said tubular member having an open upper end in communication with said inlet opening;

said generating said outflow and said generating said inflow being performed by drawing said inflow in through said inlet opening into said open upper end and then out through said open lower end so that said inflow is part of said outflow.

118. A method according to claim 117, wherein said cover member is a tubular housing comprising a top wall and a tubular wall extending downwardly from said top wall, said tubular housing being positioned over said tubular member such that said tubular wall extends downwardly alongside said tubular member to define said inlet opening as an annular downwardly facing opening between said edge portion and said tubular member, said generating said inflow including drawing said inflow upwardly from said inlet opening between said tubular wall and said tubular member and then into said open upper end of said tubular member.

119. A method according to claim 117, wherein said airflow generator comprises a single fan and wherein both generating said inflow and generating said outflow is performed by operating said fan.

120. A method according to claim 119, wherein said insect attractant is carbon dioxide and said method further comprises supplying said carbon dioxide to said tubular member.

121. A method according to claim 120, wherein said fan is positioned within said tubular member and wherein said carbon dioxide is supplied at a point higher than said fan.

122. A method according to claim 112, wherein said outflow comprises an effective amount of the insect attractant dispersed therein.

123. A method according to claim 112, wherein said insect attractant is carbon dioxide.

* * * * *